United States Patent [19]

Spurlock

[11] 4,381,368

[45] Apr. 26, 1983

[54] PROCESS FOR THE PREPARATION OF UREA-FORMALDEHYDE RESINS

[76] Inventor: Harold N. Spurlock, 2031 Woodland Rd., Petersburg, Va. 23805

[21] Appl. No.: 349,303

[22] Filed: Feb. 16, 1982

[51] Int. Cl.³ .............................................. C08L 61/20
[52] U.S. Cl. .................................... 524/598; 528/232; 528/259
[58] Field of Search ................ 528/232, 259; 524/598

[56] References Cited

U.S. PATENT DOCUMENTS

| | | | |
|---|---|---|---|
| 2,729,611 | 1/1956 | Chesley | 260/29.4 |
| 3,842,039 | 10/1974 | Vargiu et al. | 528/259 |
| 3,896,087 | 7/1975 | Brunnmueller et al. | 260/69 |
| 3,962,166 | 6/1976 | Gordon | 528/259 |
| 4,174,310 | 11/1979 | Hubbard | 260/29.4 |
| 4,246,152 | 1/1981 | Bruguera | 260/29.4 |
| 4,247,433 | 1/1981 | Schamberg et al. | 528/259 |

*Primary Examiner*—Lucille M. Phynes

[57] ABSTRACT

A process for preparing urea-formaldehyde resins is disclosed. The process involves reacting urea and formaldehyde at pH 4.5–5.5 at 90° to 100° C. at a mole ratio of 2.0:1 to 2.2:1 formaldehyde:urea, and adding additional urea under these conditions. The reaction mixture is then neutralized and cooled to 30° to 50° C. and additional urea is reacted. The reaction mixture is then cooled to from 40° to 30° C. and additional formaldehyde and urea added to bring the final mole ratio of formaldehyde:urea to from 1.05:1 to 1.15:1.

2 Claims, No Drawings

PROCESS FOR THE PREPARATION OF UREA-FORMALDEHYDE RESINS

BACKGROUND OF THE INVENTION

1. Field of the Invention

The present invention relates to a process for preparing urea-formaldehyde resins containing less than 0.2 ppm free formaldehyde.

2. Prior Art

U.S. Pat. No. 2,729,611 discloses preparing a urea-formaldehyde resin by heating an aqueous mixture of 1.4–1.9 moles of formaldehyde with 1 mole of urea at a pH of at least about 7 to form dimethylol urea, adding formaldehyde to bring the mole ratio of formaldehyde: urea to 2.1:1 to 3.1, reducing the pH to 2.5–6 while continuing the warming, discontinuing the warming and neutralizing the product.

U.S. Pat. No. 3,896,087 discloses the preparation of urea-formaldehyde resins by condensing urea and formaldehyde in aqueous acid solution in a molar ratio of from 1:1.5 to 1:2.5, further condensing at least 0.2 mole of formaldehyde per mole of urea, and adding urea to bring the molar ratio of urea to formaldehyde to from 1:1.5 to 1:2.5 at a pH between 4.0 and 6.5.

U.S. Pat. No. 4,174,310 discloses preparing urea-formaldehyde resins by condensing urea:formaldehyde in a mole ratio of from 1:3 to 1:1.5 in an aqueous solution under neutral or alkaline conditions, vacuum evaporating the reaction mixture, and further condensing the mixture optionally with additional urea under acid conditions.

U.S. Pat. No. 4,246,152 discloses preparing urea-formaldehyde resins starting with a precondensate, adding a salt and heating at 60°–65° C. while adding urea to bring the mole ratio formaldehyde to urea to 2.0:1 to 2.65:1. The pH is adjusted to 5 to 6.5 and the temperature raised to 80° to 100° C. and urea added to bring the ratio of formaldehyde to urea to from 1.5:1 to 2:1.

SUMMARY OF THE INVENTION

The process of the present invention relates to the preparation of urea-formaldehyde resins having a free formaldehyde content of less than 0.2 parts per million (ppm). The process involves heating urea and formaldehyde in a moderately high ratio of formaldehyde to urea, in two stages followed by cooling and adding additional urea and some additional formaldehyde to bring the mole ratio of formaldehyde to urea to about 1.1:1.

DETAILED DESCRIPTION

Generally the formaldehyde used will be in the form of a 35% to 55% by weight solution in water. Generally the urea added to the reaction mixture will be in solid form. Generally the pH will be adjusted to pH 6.5–7.0 prior to heating by addition of an alkali metal hydroxide or alkaline earth metal hydroxide. The mixture of urea and formaldehyde will have a mole ratio of 2.0:1 to 2.2:1 formaldehyde: urea. The mixture is heated to 90°–100° C. for 10 to 60 minutes. During the heat up stage the pH is lowered to pH 4.5–5.5 by addition of formic acid. After the initial heating and the mixture has a viscosity of E to F on the Gardner-Holt scale from 0.06 to 0.13 mole of urea per mole of formaldehyde originally present is added and the heating continued until the viscosity of the reaction mixture is in the range of W to Y on the Gardner-Holt scale, which generally takes from 40 to 70 minutes. After the pH is then adjusted to pH 6.8–7.2 by addition of an alkali metal hydroxide or alkaline earth hydroxide. The reaction mixture is then cooled to 30° C. to 70° C. and from 0.1 to 0.3 mole of urea added per mole of formaldehyde originally charged to the reaction mixture. The reaction mixture is then cooled to from 30° to 40° C. and from 0.05 to 0.2 mole of formaldehyde per mole of formaldehyde originally charged to the reaction mixture and from 0.1 to 0.3 mole of urea per mole of formaldehyde originally charged to the reaction mixture are added to the reaction mixture to bring the final ratio of formaldehyde to urea to from 1.05:1 to 1.15:1. The final products contain less than 0.2 ppm free formaldehyde.

The urea-formaldehyde resins of the present invention are especially useful as adhesives for various uses such as making plywood and particle board.

EXAMPLE

One hundred parts by weight of a 50% by weight aqueous solution of formaldehyde at pH 3.2 are charged to a reactor, fitted with heating coils, heated to 150° F. (66° C.) and adjusted to pH 6.8. Forty-eight and one-half parts by weight of urea at 150° F. (66° C.) are charged to the reactor. Over a period of one half hour the reactor is heated at 202° F. (94° C.) while the pH drops to 6.04. After an additional ten minutes the temperature has risen to 205° F. (96° C.) and the pH is adjusted to 4.70 by addition of an aqueous solution of formic acid over a period of three minutes while the temperature rises to 208° F. (98° C.). After 10 minutes the temperature has risen to 211° F. (99° C.) and the viscosity increased to E+ on the Gardner-Holt scale, at which point 9.6 parts of urea are added along with a 50% aqueous solution of sodium hydroxide to bring the pH to 5.4. After an additional 41 minutes the viscosity has risen to X on the Gardner-Holt scale and the pH is adjusted to 7.20 with a 50% aqueous solution of sodium hydroxide. The reaction mixture is permitted to cool. As the temperature drops below 150° F. (66° C.) 18.5 parts of urea are added to the reaction mixture. When the reaction mixture has cooled to below 100° F. (38° C.) 11.1 parts by weight of 50% aqueous formaldehyde and 22.2 parts of urea are added. The product resin was analyzed and found to contain less than 0.2 ppm free formaldehyde, and has a viscosity of 430 centipoises.

I claim:

1. A process comprising mixing an aqueous solution of formaldehyde and urea in a mole ratio of from 2.0:1 to 2.2:1, adjusting the pH to from 6.1 to 7.0, heating the mixture at from 90° to 100° C. for from 20 to 40 minutes, while at this temperature adjusting the pH to from 4.5 to 5.5, adding from 0.06 to 0.13 mole of additional urea per mole of formaldehyde originally present, continuing heating the mixture until the viscosity of the reaction mixture is from about W to about Y on the Gardner-Holt scale, adjusting the pH of the reaction mixture to from 6.8 to 7.2, cooling the reaction mixture to from 30° to 70° C., adding from 0.1 to 0.3 mole urea per mole of formaldehyde originally present, cooling the reaction mixture to from 30° to 40° C., and adding from 0.05 to 0.2 mole of formaldehyde per mole of formaldehyde originally present and from 0.1 to 0.3 mole of urea per mole of formaldehyde originally present to bring the total mole ratio of formaldehyde to urea to from 1.05 to 1.15 whereby a urea-formaldehyde resin containing less than 0.2 ppm free formaldehyde is produced.

2. The process of claim 1 wherein the adjustment of reaction mixture to pH 4.5 to 5.5 is by adding formic acid.

* * * * *